(12) United States Patent
Liu et al.

(10) Patent No.: US 12,516,912 B2
(45) Date of Patent: Jan. 6, 2026

(54) LIGHTWEIGHT, BALLISTIC AND BLAST-RESISTANT MULTI-PHASE COMPOSITE ARMOR MATERIAL BASED ON HIGH-TOUGHNESS HETEROGENEOUS INTERFACIAL LAYER AND METHOD FOR PREPARING THE SAME

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Qihui Chen, Taiyuan (CN); Xu Li, Taiyuan (CN); Guizhe Zhao, Taiyuan (CN)

(73) Assignees: NORTH UNIVERSITY OF CHINA, Shanxi (CN); SHANXI ZHONGBEI NEW MATERIAL TECHNOLOGY CO., LTD., Shanxi (CN)

( * ) Notice: Subject to any disclaimer, the term of this patent is extended or adjusted under 35 U.S.C. 154(b) by 374 days.

(21) Appl. No.: 18/462,964

(22) Filed: Sep. 7, 2023

(65) Prior Publication Data
US 2024/0369326 A1    Nov. 7, 2024

Related U.S. Application Data

(63) Continuation of application No. PCT/CN2023/096158, filed on May 25, 2023.

(30) Foreign Application Priority Data

Jun. 21, 2022   (CN) .......................... 202210702707.1

(51) Int. Cl.
F41H 5/04    (2006.01)

(52) U.S. Cl.
CPC .................................. *F41H 5/0428* (2013.01)

(58) Field of Classification Search
None
See application file for complete search history.

(56) References Cited

U.S. PATENT DOCUMENTS

2018/0224247 A1    8/2018  Davies et al.

FOREIGN PATENT DOCUMENTS

| CN | 103206897 A | 7/2013 |
| CN | 105444622 A | 3/2016 |
| CN | 107328304 A | 11/2017 |
| CN | 115127398 A | 9/2022 |

OTHER PUBLICATIONS

CN 105444622A Machine Translation via EPO (Year: 2016).*

* cited by examiner

*Primary Examiner* — Laura C Powers

(57) ABSTRACT

A lightweight, ballistic and blast-resistant multi-phase composite armor material based on a high-toughness heterogeneous interfacial layer, including a crack-arresting layer, a bullet-breaking layer, an energy-absorbing layer, and a support layer. The crack-arresting layer, the bullet-breaking layer, the energy-absorbing layer, and the support layer are stacked in sequence from a bullet-accepting side to the inside. Adjacent two layers are bonded with an adhesive film layer. The crack-arresting layer and the support layer are both made of a carbon fiber composite. The bullet-breaking layer is made of ceramic. The energy-absorbing layer is made of an ultra-high molecular weight polyethylene fiber composite. The adhesive film layer is made of a high-toughness heterogeneous interfacial adhesive.

10 Claims, 2 Drawing Sheets

LIGHTWEIGHT, BALLISTIC AND BLAST-RESISTANT MULTI-PHASE COMPOSITE ARMOR MATERIAL BASED ON HIGH-TOUGHNESS HETEROGENEOUS INTERFACIAL LAYER AND METHOD FOR PREPARING THE SAME

CROSS-REFERENCE TO RELATED APPLICATIONS

This application is a continuation of International Patent Application No. PCT/CN2023/096158, filed on May 25, 2023, which claims the benefit of priority from Chinese Patent Application No. 202210702707.1, filed on Jun. 21, 2022. The content of the aforementioned application, including any intervening amendments thereto, is incorporated herein by reference in its entirety.

TECHNICAL FIELD

This application relates to armor protection, and more particularly to a lightweight, ballistic and blast-resistant multi-phase composite armor material based on a high-toughness heterogeneous interfacial layer and a method for preparing the same.

BACKGROUND

Protective armor is the key to the survivability of weapons and equipment on the battlefield. As the battlefield environment is increasingly complicated, demands on protective armor materials are growing stringent, including both an unchanged overall structural rigidity under conventional conditions and a minimized weight while protecting against high-speed impacts. As a new generation of protective materials, fiber-reinforced polymer composites made from ultra-high molecular weight polyethylene (UHMWPE) fibers, polyphenylene benzodioxole (PBO) fibers, and aramid fibers as reinforcing fibers have been widely used, such as the German Leopard-2 tank armor liner, the Dutch "XA-886×6" armored vehicle liner, and the Canadian "Challenger" aircraft radome. These high-speed impact-resistant composites have excellent protective properties, and most of them have an areal density of less than 3 g/cm$^3$, which is much smaller than traditional metal protective materials, thus promoting the development of lightweight and high-mobility of weapons and equipment. However, in practice, the fiber-reinforced composite generally shows a severe back projection after being impacted by bullets. Hence, it has poor protection against non-penetrating damage and is hard to provide the stiffness necessary for structural materials. As a result, it is usually used in combination with high-modulus ceramics or metals.

Currently, the protective materials are designed mainly regarding energy dissipation, particularly on penetration behavior and protection against penetrating damage. However, for the protective armor composited from multiple types of materials, the stresses and damage subjected in the initial impact phase, erosion phase, and fracture phase during the impact process are varied, and the coupling effect of layer-by-layer diffusion of the shock wave is significant. Therefore, a single energy dissipation design can hardly resist both penetrating and non-penetrating damage, thereby facing challenges of insufficient protection against multiple impacts and a significant reduction in load-carrying capacity after impact.

Resistance to penetrating damage requires a composite with high in-plane tensile deformation ability under out-of-plane loading, so that the axial tensile properties of the fibers can be fully utilized. While resistance to non-penetrating damage requires a composite with a high in-plane stiffness to reduce depressed deformation. Traditional research based on energy dissipation mechanisms suggests that penetration resistance (i.e., resistance to penetrating damage) and depression resistance (i.e., resistance to non-penetrating damage) are a pair of mutually exclusive properties, and the key to balance the two properties lies at the interface. Hence, it is urgent to develop a heterogeneous interface bonding method with excellent bond strength, fracture toughness, and low plastic deformation in the field of special protective armor.

SUMMARY

An object of the present disclosure is to provide a lightweight, ballistic and blast-resistant multi-phase composite armor material based on a high-toughness heterogeneous interfacial layer to overcome deficiencies in the prior art. The armor material provided herein has the advantages of low density, slight back convexity, high ballistic resistance, and resistance to multiple shots, and can be used for protection against armor-piercing incendiary and explosive fragmentation.

The technical solutions of the present disclosure are described below.

In a first aspect, this application provides a lightweight, ballistic and blast-resistant multi-phase composite armor material based on a high-toughness heterogeneous interfacial layer, comprising:

a crack-arresting layer;
a bullet-breaking layer;
an energy-absorbing layer; and
a support layer;
wherein the crack-arresting layer, the bullet-breaking layer, the energy-absorbing layer, and the support layer are arranged in sequence from a bullet-accepting side to the inside; and adjacent two layers of the crack-arresting layer, the bullet-breaking layer, the energy-absorbing layer, and the support layer are bonded with an adhesive film layer;
the crack-arresting layer and the support layer are both made of a carbon fiber composite; the bullet-breaking layer is made of ceramic; the energy-absorbing layer is made of an ultra-high molecular weight polyethylene (UHMWPE) fiber composite; and the adhesive film layer is made of a high-toughness heterogeneous interfacial adhesive;
the crack-arresting layer is configured to stabilize an impact region and control a damaged area;
the bullet-breaking layer is configured for energy dissipation through fragmentation and expanding an action range of load and energy;
the energy-absorbing layer is configured to absorb the residual energy of a bullet;
the support layer is configured to provide overall structural stiffness and protect the armor material from being penetrated by the bullet; and
the adhesive film layer is configured to maintain the overall structural stability of the armor material and allow individual component materials to exert designed performance.

In some embodiments, the crack-arresting layer and the support layer are prepared from carbon fiber unidirectional fabric through laminating at $[0°/90°]_{2n}$ and a hot pressing process; a thickness of the crack-arresting layer is 1-12 mm; and a thickness of the support layer is 1-5 mm.

In some embodiments, the bullet-breaking layer consists of 1-5 ceramic layers; each of the ceramic layers is formed by splicing a plurality of square ceramic sheets with a side length of 50-100 mm; the plurality of square ceramic sheets are made of boron carbide, boron nitride, alumina, silicon carbide, silicon nitride, or a combination thereof; and a thickness of the bullet-breaking layer is 10-35 mm.

In some embodiments, the energy-absorbing layer is prepared from the UHMWPE fiber composite through laminating at $[0°/90°]_{2n}$ and a hot pressing process; a thickness of the energy-absorbing layer is 5-30 mm; and an average molecular weight of the UHMWPE fiber in the composite is $1.8\text{-}3.6 \times 10^7$ g/mol, and a volume fraction of the UHMWPE fiber in the composite is 42-67 vol. %.

In some embodiments, the adhesive film layer is prepared from an epoxy resin system, a short-fiber veil, and a core-shell rubber; wherein the epoxy resin system is prepared through mixing an epoxy monomer or prepolymer, a curing agent, and a reaction promoter and curing.

In some embodiments, the short-fiber veil is prepared from a glass fiber, a carbon fiber, a basalt fiber, an organic synthetic fiber, or a combination thereof; a mono-filament length of the fiber for preparing the short-fiber veil is 0.2-15 mm, and an aspect ratio of the fiber for preparing the short-fiber veil is 200-3000; the short-fiber veil has a thickness of 12-100 μm and an areal density of 3-100 g/m$^2$; and the fibers in the short-fiber veil exhibit a randomly-oriented mesh structure.

In some embodiments, a shell of the core-shell rubber is made of polymethyl methacrylate; a core of the core-shell rubber is made of a butadiene-styrene rubber, a polybutadiene rubber, a silicone rubber, or a combination thereof; the core-shell rubber has a spherical structure with a diameter of 100-2000 nm; and the core-shell rubber accounts for 0.5-12% by weight of the adhesive film layer.

In a second aspect, this application provides an assembly preparation method of the aforementioned multi-phase composite armor material, comprising:

(a) dissolving hydroxyethyl cellulose in deionized water followed by adding short fibers and uniform dispersion to obtain a short fiber suspension; and slowly pouring the short fiber suspension into a sieve parallel to a horizontal plane followed by rinsing, shaping, and drying to obtain a short-fiber veil;

(b) dispersing a core-shell rubber in an acetone-ethanol mixture to obtain a dispersion; adding an epoxy monomer or prepolymer to the dispersion followed by mixing and removal of the acetone and the ethanol to produce a first mixture; adding a curing agent and a reaction promoter to the first mixture followed by mixing to form a second mixture; and impregnating the short-fiber veil prepared in step (a) with the second mixture followed by calendering process to obtain an adhesive film layer with a required epoxy resin content and thickness; and (c) separately preparing a crack-arresting layer, a bullet-breaking layer, a energy-absorbing layer, and a support layer through a hot pressing process; stacking the crack-arresting layer, the bullet-breaking layer, the energy-absorbing layer, and the support layer on a rigid single-sided mold in sequence, wherein the adhesive film layer is spread between adjacent two layers of the crack-arresting layer, the bullet-breaking layer, the energy-absorbing layer, and the support layer to form a stacked material system; sealing the stacked material system in a sealing tool followed by curing in a hot-press tank to obtain a multi-phase composite armor material.

In some embodiments, after cured in step (c), the adhesive film layer has a bending strength of 150 MPa, a maximum bending strain of 7%, and a mode I critical energy release rate of 1.7 KJ/m$^2$; an adhesive interface has a mode I critical energy release rate of 1.3 kJ/m$^2$, a mode II critical energy release rate of 2.1 kJ/m$^2$, and an interlaminar shear strength of 85 MPa; and the multi-phase composite armor material has a thickness of 17-82 mm and an areal density p of 200 kg/m$^2$ or less, and a protection level $V_{50}$ of the multi-phase composite armor material against a 56-type 14.5-mm armor-piercing projectile is equal to or larger than 980 m/s.

In a third aspect, this application provides an integrated molding preparation method of the aforementioned multi-phase composite armor material, comprising:

(I) dissolving hydroxyethyl cellulose in deionized water followed by adding short fibers and uniform dispersion to obtain a short fiber suspension; and slowly pouring the short fiber suspension into a sieve parallel to a horizontal plane followed by rinsing, shaping, and drying to obtain a short-fiber veil;

(II) dispersing a core-shell rubber in an acetone-ethanol mixture to obtain a dispersion; adding an epoxy monomer or prepolymer to the dispersion followed by mixing and removal of the acetone and the ethanol to produce a first mixture; adding a curing agent and a reaction promoter to the first mixture followed by mixing to form a second mixture; and impregnating the short-fiber veil prepared in step (I) with the second mixture followed by calendering to obtain an adhesive film layer with a required epoxy resin content and thickness; and (III) stacking a first carbon fiber fabric prepreg layer, a bullet-breaking layer, a UHMWPE fiber fabric prepreg layer, and a second carbon fiber fabric prepreg layer on a rigid single-sided mold in sequence, wherein the adhesive film layer is spread between adjacent layers to form a stacked material system; sealing the stacked material system in a sealing tool followed by curing in a hot-press tank to obtain a multi-phase composite armor material.

In some embodiments, after cured in step (III), the adhesive film layer has a bending strength of 150 MPa, a maximum bending strain of 7%, and a mode I critical energy release rate of 1.7 KJ/m$^2$; an adhesive interface has a mode I critical energy release rate of 1.3 kJ/m$^2$, a mode II critical energy release rate of 2.1 kJ/m$^2$, and an interlaminar shear strength of 85 MPa; and the multi-phase composite armor material has a thickness of 17-82 mm and an areal density p of 200 kg/m$^2$ or less, and a protection level $V_{50}$ of the multi-phase composite armor material against a 56-type 14.5-mm armor-piercing projectile is equal to or larger than 980 m/s.

Compared to the prior art, this application has the following beneficial effects.

(1) In this application, the cured adhesive film layer has a bending strength of 150 MPa, a maximum bending strain of 7%, and a mode I critical energy release rate of 1.7 KJ/m$^2$. The adhesive interface has a mode I critical energy release rate of 1.3 KJ/m$^2$ and a mode II critical energy release rate of 2.1 kJ/m$^2$. The interlayer shear strength can reach 85 MPa.

(2) The lightweight, ballistic and blast-resistant multi-phase composite armor material based on a high-toughness heterogeneous interfacial layer in this application has a thickness of 17-82 mm and an areal density of $\rho \leq 200$ kg/m$^2$. Moreover, it can solve the problems of high density, serious back bulging, and insufficient resistance to continuous shooting in the current ballistic and blast-resistant armor materials.

(3) The bonding method provided herein can effectively enhance the bonding strength of heterogeneous interfaces, increase the critical energy release rate, and improve the protection level of protective armor against penetrating and non-penetrating damage, particularly, reaching a protection level of $V_{50 \geq 980}$ m/s against 56-type 14.5 mm armor-piercing incendiary ammunition.

(4) The lightweight, ballistic and blast-resistant multi-phase composite armor material provided herein has a wide range of applications, such as ballistic and blast-resistant armor and a variety of high-speed impact-resistant structures, e.g., high-speed train bodies, aircraft shells, radomes, and individual protection equipment.

Figure 1:
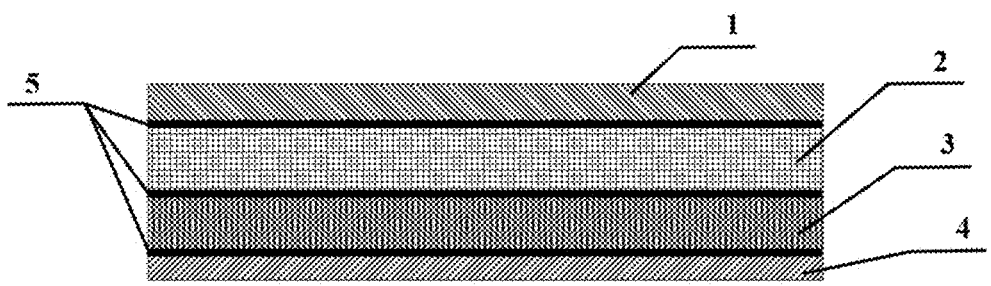
FIG. 1 schematically shows a structure of a lightweight, ballistic and blast-resistant multi-phase composite armor material based on a high-toughness heterogeneous interfacial layer according to an embodiment of the present disclosure.

In the drawings, 1, crack-arresting layer; 2, bullet-breaking layer; 3, energy-absorbing layer; 4, support layer; and 5, adhesive film layer.

DETAILED DESCRIPTION OF EMBODIMENTS

The present disclosure will be further described below with reference to the embodiments.

As shown in FIG. 1, this application provides a lightweight, ballistic and blast-resistant multi-phase composite armor material based on a high-toughness heterogeneous interfacial layer, which includes a crack-arresting layer 1, a bullet-breaking layer 2, an energy-absorbing layer 3, and a support layer 4, where the crack-arresting layer 1, the bullet-breaking layer 2, the energy-absorbing layer 3, and the support layer 4 are arranged in sequence from bullet-accepting side to the inside; and adjacent two layers of the crack-arresting layer 1, the bullet-breaking layer 2, the energy-absorbing layer 3, and the support layer 4 are bonded with an adhesive film layer 5. The crack-arresting layer 1 and the support layer 4 are both made of a carbon fiber composite. The bullet-breaking layer 2 is made of ceramic. The energy-absorbing layer 3 is made of an ultra-high molecular weight polyethylene (UHMWPE) fiber composite. The adhesive film layer 5 is made of a high-toughness heterogeneous interfacial adhesive.

The crack-arresting layer 1 is configured to stabilize an impact region and control a damaged area.

The bullet-breaking layer 2 is configured for energy dissipation through fragmentation and expanding an action range of load and energy.

The energy-absorbing layer 3 is configured to absorb the residual energy of a bullet. The support layer 4 is configured to provide overall structural stiffness and protect the armor material from being penetrated by the bullet.

The adhesive film layer 5 is configured to maintain the overall structural stability of the armor material and allow individual component materials to exert designed performance.

The short-fiber veil in the adhesive film layer 5 can increase the modulus of the adhesive layer, assist in stress transfer, and fully exert the overall load-bearing properties of the structure. When a micro-crack initially occurs, the short fibers can connect the two sides of the micro-crack, disperse the stress concentration at the tip of the micro-crack, and thus prevent the micro-crack from expanding, thereby inhibiting delaminated damage.

The core-shell rubber in the adhesive film layer 5 can dissipate energy through a series of behaviors such as intrinsic plastic deformation, de-bonding, and inducing plastic deformation of the substrate, so as to resist the initial damage caused by external impact. And at the same time, due to the size effect and the restraint of the short fibers, the plastic deformation is concentrated in a local small-scale range, and therefore, the overall stiffness of the adhesive film layer is not significantly reduced.

Due to the low introduction of the thin short-fiber veil and the core-shell rubber, the overall chemical properties of the epoxy resin system are maintained, while the adhesion strength and bending properties of the adhesive film layer are significantly improved owing to the improved properties of the epoxy resin system.

Example 1

Provided herein was an assembly preparation method of a lightweight, ballistic and blast-resistant multi-phase composite armor material.

In this example, the crack-arresting layer 1 and the support layer 4 were prepared from 12 K unidirectional fabric weaved by T700 carbon fibers as the reinforcement material and a bisphenol A-type epoxy resin E-44 monomer and an amine curing agent as the matrix material. The bullet-breaking layer 2 consisted of a single layer of square B$_4$C ceramic sheets with a side length of 50 mm and a thickness of 10 mm.

The carbon fiber unidirectional fabric was infiltrated with a resin system by a hand lay-up process. 30 layers of the infiltrated carbon fiber unidirectional fabrics were laid on the surface of a mold at a $[0°/90°]_{2n}$ symmetrical lay-up manner and cured by heating to obtain the crack-arresting layer 1.

The carbon fiber unidirectional fabric was infiltrated with a resin system by a hand lay-up process. 8 layers of the infiltrated carbon fiber unidirectional fabrics were laid on the surface of a mold at a $[0°/90°]_{2n}$ symmetrical lay-up manner and cured by heating to obtain the support layer 4.

The energy-absorbing layer 3 was made of unidirectional ultra-high molecular weight polyethylene fiber prepreg with an average molecular weight of $1.8 \times 10^7$ g/mol.

180 layers of a unidirectional UHMWPE fiber prepreg were laid in the surface of a mold at a $[0°/90°]_{2n}$ symmetrical lay-up manner and then placed in a press followed by a hot pressing at a pressure of 10 MPa for 40 min and cooling naturally to room temperature.

Figure 2:
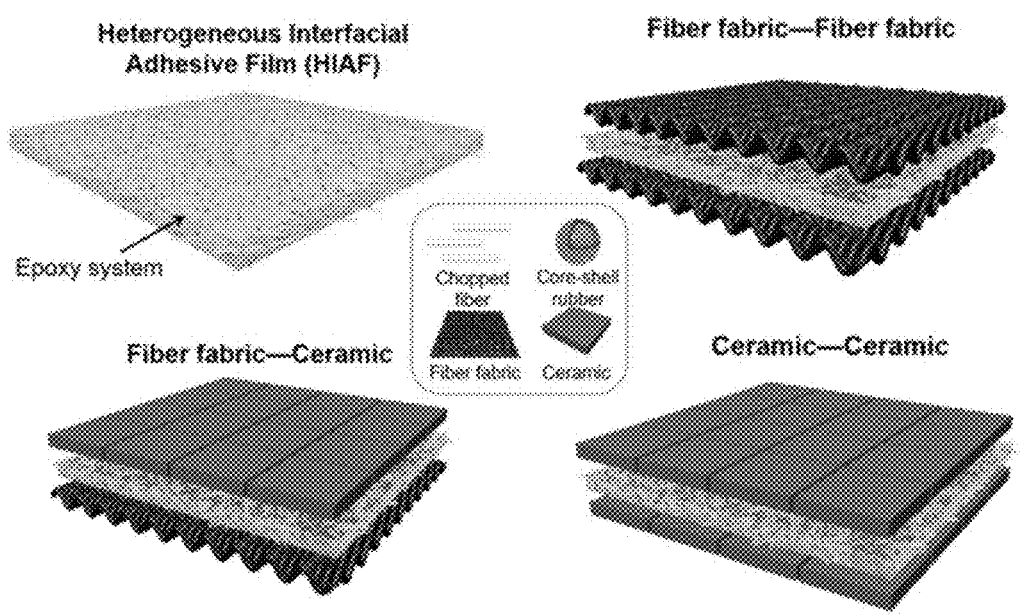
FIG. 2 schematically shows a structure of a high-toughness heterogeneous interfacial layer and the bonding process of an adhesive film layer with other layers of the armor material according to an embodiment of the present disclosure.

The adhesive film layer 5 was prepared from an epoxy resin system, a short-fiber veil, and a core-shell rubber, where the epoxy resin system consisted of bisphenol A epoxy-type resin E-51, an anhydride-based curing agent (methylhexahydrophthalic anhydride), and an accelerator (2,4,6-triphenol). The short-fiber veil consisted of E-glass fibers having a length of 6 mm, which had an areal density of 20 g/m$^2$. The core-shell rubber had a diameter of approximately 100 nm, with polymethyl methacrylate as the shell material and polybutadiene rubber as the core material. The total thickness of the adhesive film layer 5 was 60 μm, as shown in FIG. 2.

The structure of the lightweight, ballistic and blast-resistant multi-phase composite armor material is shown in FIG. 1, and the armor material was assembled through the following steps. The crack-arresting layer 1, the bullet-breaking layer 2, the energy-absorbing layer 3, and the support layer 4 were stacked on a rigid single-sided mold in sequence, where the adhesive film layer 5 was placed between adjacent two layers of the crack-arresting layer, the bullet-breaking layer, the energy-absorbing layer, and the support layer to form a stacked material system. The stacked material system was sealed into a sealing tool and then transferred to a hot-press tank for curing for 2 h under an internal pressure of 1 atm and an external pressure of 3 atm to obtain the lightweight, ballistic and blast-resistant multi-phase composite armor material.

The cured adhesive film layer and the produced lightweight, ballistic and blast-resistant multi-phase composite armor material were tested for the following properties.

The cured adhesive film layer was tested regarding bending properties according to ISO 178 and mode I fracture toughness according to ASTM D5528.

Mode I fracture toughness for the heterogeneous interfaces of the composite armor material was tested according to ASTM D5528. Mode II fracture toughness for the heterogeneous interfaces of the composite armor material was tested according to ASTM D7905. The interlayer shear of the composite armor material was tested according to ASTM D2344.

The ballistic resistance of the composite armor material was tested according to GJB8486-2015 (China), based on which the firearm, cartridge, and charge were amended. In this application, a Type-56 14.5 mm armor-piercing incendiary ammunition was used for testing, where the discharge speed was controlled by the charge of the cartridge case; the distance between the sample plate and the muzzle was 25 m, and each sample fired 5 rounds with the distance between the entry holes≥210 mm.

The test results are listed below.

The cured adhesive film layer had a bending strength of 128 MPa, a maximum bending strain of 6%, and a mode I critical energy release rate of 1.7 kJ/m². The adhesive interface has a mode I critical energy release rate of 1.2 KJ/m², a mode II critical energy release rate of 1.9 kJ/m², and an interlayer shear strength of 79 MPa.

The obtained composite armor material had an areal density p of 115 kg/m² and a protection level $V_{50}$ of 957 m/s against the 56-type 14.5 mm armor-piercing incendiary ammunition.

Example 2

Provided herein was an integrated molding preparation method of a lightweight, ballistic and blast-resistant multi-phase composite armor material.

In this example, the crack-arresting layer 1 and the support layer 4 were prepared from 6 K unidirectional fabric weaved by T300 carbon fibers as the reinforcement material and a matrix material, where the matrix material was prepared from bisphenol F-type epoxy resin E-51 prepolymer, an anhydride-based curing agent (methylhexahydrophthalic anhydride), and an accelerator (2,4,6-triphenol). The bullet-breaking layer 2 consisted of a single layer of square $B_4C$ ceramic sheets with a side length of 50 mm and a thickness of 6 mm.

The adhesive film layer 5 was prepared from an epoxy resin system, a short-fiber veil, and a core-shell rubber, where the epoxy resin system consisted of bisphenol F-type epoxy resin E-51 prepolymer, an anhydride-based curing agent (methylhexahydrophthalic anhydride), and an accelerator (2,4,6-triphenol). The short-fiber veil consisted of aramid fibers having a length of 6 mm, which had an areal density of 8 g/m². The core-shell rubber had a diameter of approximately 300 nm, with polymethyl methacrylate as the shell material and silicone rubber as the core material. The total thickness of the adhesive film layer 5 was 20 μm, as shown in FIG. 2. The energy-absorbing layer 3 was made of unidirectional ultra-high molecular weight polyethylene fiber prepreg with an average molecular weight of $2.5 \times 10^7$ g/mol. The lightweight, ballistic and blast-resistant multi-phase composite armor material was prepared through the integrated molding preparing method, which included the following steps. Carbon fiber fabric prepregs, the bullet-breaking layer 2, UHMWPE fiber fabric prepregs, and carbon fiber fabric prepregs were stacked on a rigid single-sided mold in sequence, where the adhesive film layer 5 was placed between adjacent two layers to form a stacked material system. The stacked material system was sealed into a sealing tool and then transferred to a hot-press tank for curing at an inner pressure of 1 atm and an outer pressure of 3 atm for 2 h to obtain the lightweight, ballistic and blast-resistant multi-phase composite armor material.

The cured adhesive film layer and the produced lightweight, ballistic and blast-resistant multi-phase composite armor material were tested according to the methods and criteria mentioned in Example 1, and the test results are listed below.

The cured adhesive film layer had a bending strength of 146 MPa, a maximum bending strain of 6%, and a mode I critical energy release rate of 1.4 KJ/m². The adhesive interface has a mode I critical energy release rate of 1.1 kJ/m², a mode II critical energy release rate of 1.8 KJ/m², and an interlayer shear strength of 85 MPa.

The obtained composite armor material had an areal density p of 126 kg/m² and a protection level $V_{50}$ of 980 m/s against 56-type 14.5 mm armor-piercing incendiary ammunition.

What is claimed is:

1. A multi-phase composite armor material, comprising:
   a crack-arresting layer;
   a bullet-breaking layer;
   an energy-absorbing layer; and
   a support layer;
   wherein the crack-arresting layer, the bullet-breaking layer, the energy-absorbing layer, and the support layer are arranged in sequence from a bullet-accepting side to the inside; and adjacent two layers of the crack-arresting layer, the bullet-breaking layer, the energy-absorbing layer, and the support layer are bonded with an adhesive film layer;
   the crack-arresting layer and the support layer are both made of a carbon fiber composite; the bullet-breaking layer is made of ceramic; the energy-absorbing layer is made of an ultra-high molecular weight polyethylene (UHMWPE) fiber composite; and the adhesive film layer is made of a heterogeneous interfacial adhesive;
   the crack-arresting layer is configured to stabilize an impact region and control a damaged area;

the bullet-breaking layer is configured for energy dissipation through fragmentation and expanding an action range of load and energy;
the energy-absorbing layer is configured to absorb a residual energy of a bullet;
the support layer is configured to provide overall structural stiffness and protect the armor material from being penetrated by a bullet;
the adhesive film layer is configured to maintain an overall structural stability of the armor material and allow individual component materials to exert designed performance; and
the adhesive film layer is prepared from an epoxy resin system, a short-fiber veil, and a core-shell rubber; wherein the epoxy resin system is prepared through mixing an epoxy monomer or prepolymer, a curing agent, and a reaction promoter and curing.

2. The multi-phase composite armor material of claim 1, wherein the crack-arresting layer and the support layer are prepared from carbon fiber unidirectional fabric through laminating at $[0°/90°]_{2n}$ and a hot pressing process; a thickness of the crack-arresting layer is 1-12 mm; and a thickness of the support layer is 1-5 mm.

3. The multi-phase composite armor material of claim 1, wherein the bullet-breaking layer consists of 1-5 ceramic layers; each of the ceramic layers is formed by splicing a plurality of square ceramic sheets with a side length of 50-100 mm; the plurality of square ceramic sheets are made of boron carbide, boron nitride, alumina, silicon carbide, silicon nitride, or a combination thereof; and a thickness of the bullet-breaking layer is 10-35 mm.

4. The multi-phase composite armor material of claim 1, wherein the energy-absorbing layer is prepared from the UHMWPE fiber composite through laminating at $[0°/90°]_{2n}$ and a hot pressing process; a thickness of the energy-absorbing layer is 5-30 mm; and an average molecular weight of a UHMWPE fiber in the UHMWPE fiber composite is $1.8-3.6 \times 10^7$ g/mol, and a volume fraction of the UHMWPE fiber in the UHMWPE fiber composite is 42-67 vol. %.

5. The multi-phase composite armor material of claim 1, wherein the short-fiber veil is prepared from a glass fiber, a carbon fiber, a basalt fiber, an organic synthetic fiber, or a combination thereof; a mono-filament length of a fiber for preparing the short-fiber veil is 0.2-15 mm, and an aspect ratio of the fiber for preparing the short-fiber veil is 200-3000; the short-fiber veil has a thickness of 12-100 μm and an areal density of 3-100 g/m²; and fibers in the short-fiber veil exhibit a randomly-oriented mesh structure.

6. The multi-phase composite armor material of claim 1, wherein a shell of the core-shell rubber is made of polymethyl methacrylate; a core of the core-shell rubber is made of a butadiene-styrene rubber, a polybutadiene rubber, a silicone rubber, or a combination thereof; the core-shell rubber has a spherical structure with a diameter of 100-2000 nm; and the core-shell rubber accounts for 0.5-12% by weight of the adhesive film layer.

7. An assembly preparation method of the multi-phase composite armor material of claim 1, comprising:
(a) dissolving hydroxyethyl cellulose in deionized water followed by adding short fibers and uniform dispersion to obtain a short fiber suspension; and slowly pouring the short fiber suspension into a sieve parallel to a horizontal plane followed by rinsing, shaping, and drying to obtain the short-fiber veil;
(b) dispersing a core-shell rubber in an acetone-ethanol mixture to obtain a dispersion; adding an epoxy monomer or prepolymer to the dispersion followed by mixing and removal of acetone and ethanol to produce a first mixture; adding a curing agent and a reaction promoter to the first mixture followed by mixing to form a second mixture; and impregnating the short-fiber veil prepared in step (a) with the second mixture followed by a calendering process to obtain an adhesive film layer with a required epoxy resin content and thickness; and
(c) separately preparing a crack-arresting layer, a bullet-breaking layer, an energy-absorbing layer, and a support layer through a hot pressing process; stacking the crack-arresting layer, the bullet-breaking layer, the energy-absorbing layer, and the support layer in a rigid single-sided mold in sequence, wherein the adhesive film layer is spread between adjacent two layers of the crack-arresting layer, the bullet-breaking layer, the energy-absorbing layer, and the support layer to form a stacked material system; sealing the stacked material system in a sealing tool followed by curing in a hot-press tank to obtain the multi-phase composite armor material.

8. The assembly preparation method of claim 7, wherein after cured in step (c), the adhesive film layer has a bending strength of 150 MPa, a maximum bending strain of 7%, and a mode I critical energy release rate of 1.7 KJ/m²; an adhesive interface has a mode I critical energy release rate of 1.3 KJ/m², a mode II critical energy release rate of 2.1 kJ/m², and an interlaminar shear strength of 85 MPa; and the multi-phase composite armor material has a thickness of 17-82 mm and an areal density p of 200 kg/m² or less, and a protection level $V_{50}$ of the multi-phase composite armor material against a 56-type 14.5-mm armor-piercing projectile is equal to or larger than 980 m/s.

9. An integrated molding preparation method of the multi-phase composite armor material of claim 1, comprising:
(I) dissolving hydroxyethyl cellulose in deionized water followed by adding short fibers and uniform dispersion to obtain a short fiber suspension; and slowly pouring the short fiber suspension into a sieve parallel to a horizontal plane followed by rinsing, shaping, and drying to obtain a short-fiber veil;
(II) dispersing a core-shell rubber in an acetone-ethanol mixture to obtain a dispersion; adding an epoxy monomer or prepolymer to the dispersion followed by mixing and removal of acetone and ethanol to produce a first mixture; adding a curing agent and a reaction promoter to the first mixture followed by mixing to form a second mixture; and impregnating the short-fiber veil prepared in step (I) with the second mixture followed by a calendering process to obtain an adhesive film layer with a required epoxy resin content and thickness; and
(III) stacking a first carbon fiber fabric prepreg layer, a bullet-breaking layer, a UHMWPE fiber fabric prepreg layer, and a second carbon fiber fabric prepreg layer in a rigid single-sided mold in sequence, wherein the adhesive film layer is spread between adjacent layers to form a stacked material system; and sealing the stacked material system in a sealing tool followed by curing in a hot-press tank to obtain the multi-phase composite armor material.

10. The integrated molding preparation method of claim 9, wherein after cured in step (III), the adhesive film layer has a bending strength of 150 MPa, a maximum bending strain of 7%, and a mode I critical energy release rate of 1.7

KJ/m$^2$; an adhesive interface has a mode I critical energy release rate of 1.3 kJ/m$^2$, a mode II critical energy release rate of 2.1 kJ/m$^2$, and an interlaminar shear strength of 85 MPa; and the multi-phase composite armor material has a thickness of 17-82 mm and an areal density p of 200 kg/m$^2$ or less, and a protection level $V_{50}$ of the multi-phase composite armor material against a 56-type 14.5-mm armor-piercing projectile is equal to or larger than 980 m/s.

\* \* \* \* \*